UNITED STATES PATENT OFFICE.

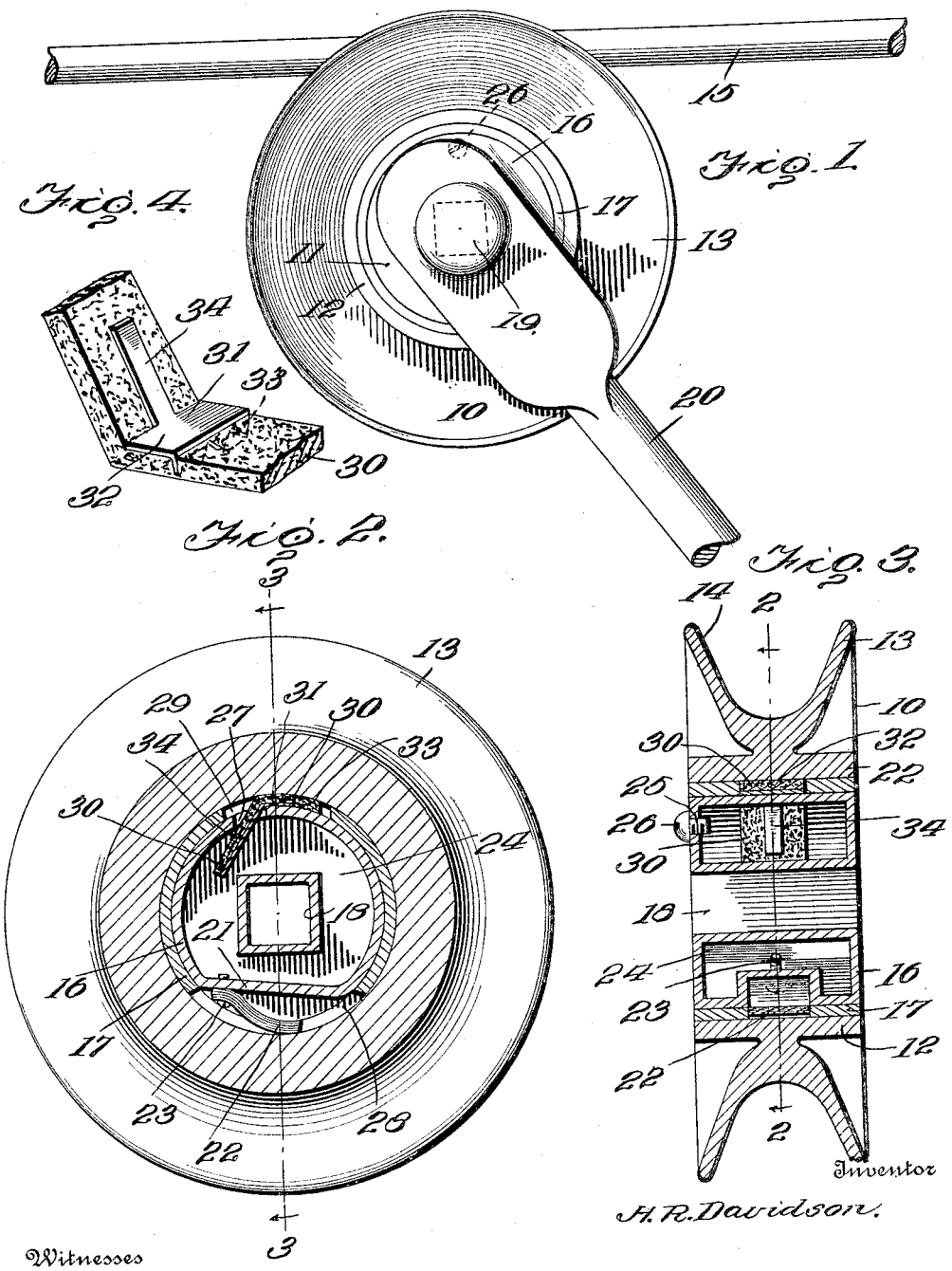

HARRY R. DAVIDSON, OF LACKAWANNA, NEW YORK.

TROLLEY-WHEEL.

1,132,168.        Specification of Letters Patent.        Patented Mar. 16, 1915.

Application filed December 1, 1913. Serial No. 804,017.

*To all whom it may concern:*

Be it known that I, HARRY R. DAVIDSON, a citizen of the United States, residing at Lackawanna, in the county of Erie and State of New York, have invented certain new and useful Improvements in Trolley-Wheels, of which the following is a specification.

My invention relates to improvements in trolley wheels, the primary object of my invention being the provision of a trolley wheel having a hub which is adapted to be fixed against rotation in a trolley harp and about which the body of the wheel proper revolves, this hub carrying a sleeve or bushing and all necessity for a false bushing being thereby avoided.

A still further object of my invention is the provision of an oil reservoir in the hub of the wheel and a wick leading from this reservoir to supply the oil to the bearing surfaces of the wheel proper and hub. And a still further object of my invention is the provision of an improved form of wick holder arranged to prevent the wick from working out of the reservoir during use.

With these and other objects in view, the invention will be more fully described, illustrated in the accompanying drawing, and then specifically pointed out in the claims which are attached to and form a part of this application.

In the drawing: Figure 1 is a side elevation of my improved trolley wheel; Fig. 2 is a sectional view on the line 2—2 of Fig. 3; Fig. 3 is a sectional view on the line 3—3 of Fig. 2; Fig. 4 is a perspective view of the wick and wick holder removed from the trolley wheel.

Corresponding and like parts are referred to in the following description and indicated in all the views of the drawing by the same reference characters.

The preferred embodiment of my invention, as disclosed in the drawing, includes a wheel proper or body, indicated as a whole by the numeral 10 and a hub indicated as a whole by the numeral 11. The body of the wheel consists of a cylindrical portion or sleeve 12 having radially extending, diverging, peripheral flanges 13 providing the customary groove 14 for the reception of the trolley wire 15.

The hub 11 includes a body portion 16 and sleeve or bushing 17. The body portion 16 of the hub is cylindrical in shape and is provided centrally with a squared bore 18 to receive a squared axle 19 by means of which the wheel is rotatably mounted in the trolley harp 20. This body portion 16 of the hub is flattened at one side as shown at 21 to receive a metallic collector brush 22, formed of resilient metal and secured at one end to the flattened portion of the peripheral face of the hub by a screw or other fastening device 23, the opposite end of the brush normally extending beyond the periphery of the hub as will be later explained. The hub proper 16 is further provided with an annular chamber 24 to receive oil or other lubricant, this chamber being provided at one side with a filling opening 25 closed by a screw or other suitable closure 26. The peripheral face of the hub member 16 is provided with a slot 27 through which the lubricant may feed.

The sleeve or bushing 17, which forms part of the hub 11, surrounds the body portion 16 of the hub, being firmly secured thereto in any suitable manner so that the sleeve and hub will remain stationary while the wheel proper 10 revolves about them. This sleeve is preferably formed of steel and is provided with slots 28 and 29, the former permitting the free end of the collector brush to engage directly against the inner face of the wheel proper 10 and the latter providing a seat for a wick 30. The hub proper and wheel proper are preferably formed of bronze or other suitable metal.

The wick 30 may be woven or it may consist of a strip of felt or other suitable material. In either case, that end of the wick projecting from the oil chamber 24 is extended in such direction that during use the wheel tends to draw the wick from the reservoir, the free end of the wick seating in the slot 29. In order to prevent withdrawal of the wick from the reservoir and consequent wading of the same in the slot 29, I provide a wick holder, indicated as a whole by the numeral 31. This wick holder includes a substantially rectangular shaped body member 32 which seats transversely of the slot 29 and which is provided at one edge with outwardly directed teeth 33 which engage the wick and at its other end with an angularly directed extension 34 which projects through the slot 27 and into the reservoir. This extension bears against the edge of the slot 27 and therefore prevents movement of the main body of the wick holder, the wick holder in turn preventing slipping of the wick.

From the foregoing description, taken in connection with the drawings, the operation of my improved trolley wheel will be readily understood. The hub and its sleeve or bushing being mounted upon a squared axle, are held against turning movement in the harp, the wheel proper revolving about the hub and the bearing surfaces of the wheel proper and of the bushing 17 being lubricated by means of oil supplied through the wick 30. The current passes from the trolley wheel 15 to the body of the wheel from which it is taken by the collector brush 22 directly to the hub proper and through the hub to the axle and so to the trolley harp. This construction therefore does away with any make and break circuit and prevents blistering of the bearings as there are no arcs from loose connection. As the axle is fixed all wear upon the trolley harp proper is avoided.

It will of course be understood that I do not wish in any way to limit myself to the specific details of construction illustrated in the drawing and described in the specification, as various minor changes may be made at any time without in the slightest degree departing from the spirit of my invention.

Having thus described the invention, what is claimed as new is:

1. A trolley wheel including a hollow annular hub, a separable sleeve fixed about the hub, the hub and sleeve having registering openings and a wheel body proper mounted on and for rotation about the sleeve.

2. A trolley wheel including a hollow annular hub apertured to receive a squared axle and provided with an annular oil chamber, a separable sleeve surrounding the hub and fixed thereto, a wheel proper mounted upon and to revolve about the sleeve, and means for supplying oil from the chamber and through the sleeve to the bearing surfaces of the wheel proper and sleeve.

3. A trolley wheel including a hollow annular hub apertured to receive a squared axle and provided with an annular oil chamber, a separable sleeve surrounding the hub and fixed thereto, a wheel proper mounted upon and to revolve about the sleeve, and means for supplying oil from the chamber to the bearing surfaces of the wheel proper and sleeve, said means including a wick extending through slots formed in the hub and sleeve and bearing against the inner face of the wheel.

4. A trolley wheel including a cylindrical hub apertured to receive a squared axle and provided with an annular oil chamber, a separable sleeve surrounding the hub and fixed thereto, a wheel proper mounted to revolve about the sleeve, and means for supplying oil from the chamber to the bearing surfaces of the wheel proper and sleeve, said means including a wick extending through slots formed in the hub and sleeve and bearing against the inner face of the wheel, and a holder for the wick.

5. A trolley wheel including a hub adapted to receive a squared axle and provided with an annular oil chamber and a slot in its peripheral face communicating with the chamber, a sleeve surrounding the hub and fixed thereto, the sleeve being provided with a slot in alinement with the slot of the hub, a wheel proper rotatably mounted about the sleeve, a wick extending by one end into the oil chamber and seating by its other end in the slot of the sleeve, and a wick holder including a body member seating in the slot of the sleeve and having wick engaging teeth, and an extension projecting through the slot of the hub and into the oil chamber.

6. A trolley wheel including a hub provided with an annular oil chamber, a sleeve surrounding the hub and provided with a recess, a wheel proper mounted to revolve about the sleeve, a wick extending at one end into the oil chamber and at its other end through a slot in the hub to seat in the recess of the sleeve, and a separable holder for maintaining the wick in place.

7. A trolley wheel including a hub provided with an annular oil chamber, a sleeve surrounding the hub and provided with a recess, a wheel proper mounted to revolve about the sleeve, a wick extending at one end into the oil chamber and at its other end through a slot in the hub to seat in the recess of the sleeve, and a separable holder for maintaining the wick in place, said holder including a wick engaging portion seating in the recess of the sleeve and an extension projecting into the oil chamber.

In testimony whereof I affix my signature in presence of two witnesses.

HARRY R. DAVIDSON. [L. S.]

Witnesses:
 JOHN M. MCCAFFNEY,
 GATES KORSBURG.

Copies of this patent may be obtained for five cents each, by addressing the "Commissioner of Patents, Washington, D. C."